(12) United States Patent
Yang

(10) Patent No.: US 10,406,641 B2
(45) Date of Patent: Sep. 10, 2019

(54) ALL-IN-ONE ASSEMBLY OF AUGER MOTOR FOR REFRIGERATOR AND METHOD FOR MANUFACTURING THE SAME

(71) Applicant: Dongbu Daewoo Electronics Corporation, Seoul (KR)

(72) Inventor: Sung Jin Yang, Seoul (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 620 days.

(21) Appl. No.: 14/839,773

(22) Filed: Aug. 28, 2015

(65) Prior Publication Data

US 2016/0370069 A1 Dec. 22, 2016

(30) Foreign Application Priority Data

Jun. 17, 2015 (KR) .................. 10-2015-0085829

(51) Int. Cl.
| | | |
|---|---|---|
| *B23P 15/00* | (2006.01) | |
| *F25C 5/00* | (2018.01) | |
| *F25C 5/20* | (2018.01) | |
| *F25C 1/147* | (2018.01) | |

(52) U.S. Cl.
CPC ............. *B23P 15/00* (2013.01); *F25C 1/147* (2013.01); *F25C 5/00* (2013.01); *F25C 5/20* (2018.01)

(58) Field of Classification Search
CPC .......... F25C 2305/00; F25C 5/20; F25C 5/00; F25C 1/147; F25C 2700/08; F25C 2700/10

USPC ........................................... 62/379
See application file for complete search history.

(56) References Cited

U.S. PATENT DOCUMENTS

| 7,895,843 B1* | 3/2011 | Hawkins ............... F25D 17/065 |
| | | 62/340 |
| 2005/0275326 A1* | 12/2005 | Lim ...................... F25D 25/024 |
| | | 312/408 |
| 2006/0260344 A1 | 11/2006 | Martin et al. |
| 2013/0000345 A1 | 1/2013 | Vitan et al. |
| 2013/0167569 A1* | 7/2013 | Lee ......................... F25C 5/046 |
| | | 62/129 |

(Continued)

FOREIGN PATENT DOCUMENTS

| EP | 2610562 A2 | 7/2013 |
| EP | 2610563 A2 | 7/2013 |
| KR | 10-2013-0078532 | 7/2013 |

OTHER PUBLICATIONS

Extended European Search Report dated Oct. 13, 2016 issued in corresponding European Patent Application No. 15186843.7.

*Primary Examiner* — Frantz F Jules
*Assistant Examiner* — Steve S Tanenbaum

(57) ABSTRACT

An all-in-one system of an auger motor for a refrigerator and a method for manufacturing the same are described. An all-in-one system of an auger motor for a refrigerator, comprising: a casing configured to integrally form a selector casing portion, an auger motor casing portion, and a cold air duct connector casing portion in one body; an ice selector configured to be installed in the selector casing portion; an auger motor device configured to be installed in the auger motor casing portion; and a cold air duct connector configured to be installed in the cold air duct connector casing portion.

12 Claims, 8 Drawing Sheets

(56) References Cited

U.S. PATENT DOCUMENTS

2015/0128633 A1* 5/2015 Mitchell ................ F25C 1/147
62/344

* cited by examiner

ALL-IN-ONE ASSEMBLY OF AUGER MOTOR FOR REFRIGERATOR AND METHOD FOR MANUFACTURING THE SAME

RELATED APPLICATIONS

This application is based on and claims priority to Korean Patent Application No. 10-2015-0085829, filed on Jun. 17, 2015, the disclosure of which is incorporated herein in its entirety by reference.

FIELD OF THE INVENTION

Embodiments of the present invention relate to an auger motor for a refrigerator and a method for manufacturing the same.

BACKGROUND OF THE INVENTION

A refrigerator is a device for low temperature storage of food and may be configured to provide freezing storage or cold storage of food according to the kind of food a user wants to store.

The inside of a refrigerator is cooled by a supply of cold air; this cold air is continuously generated by a heat exchange process with a refrigerant, based on a freezing cycle which goes through a process of compression-condensation-expansion-evaporation. The cold air supplied to the inside of the refrigerator is evenly transferred to the inside of the refrigerator by convection.

Generally, the main body of a refrigerator has a rectangular parallelepiped shape, the front surface of which opens, and the main body of the refrigerator may harbor a refrigerating compartment and a freezing compartment. Further, the front surface of the main body may be provided with a refrigerating compartment door and a freezing compartment door for selectively shielding an opening portion. A storage space in the refrigerator may be provided with multiple drawers, shelves or receiving boxes in which various foods may be stored in an optimal condition.

Top mount type refrigerators, in which a freezing compartment is positioned in the upper section and a refrigerating compartment is positioned in the lower section, are well-known. Recently, however, for user convenience, bottom freezer type refrigerators (in which the freezing compartment is positioned in the lower section) have been produced. In the case of the bottom freeze type refrigerator, the more frequently used refrigerating compartment is positioned in the upper section and a relatively less used freezing compartment is positioned at a lower position; thus, a user may conveniently use the refrigerating compartment. However, since the freezing compartment is located in the lower section, the bottom freezer type refrigerator has a disadvantage in that a user needs to bend down to open the freezing compartment door to take out ice.

To solve the above issue, a refrigerator has been produce in which a dispenser for taking out ice is installed in the refrigerating compartment door positioned in the upper part of the bottom freeze type refrigerator. In this case, the refrigerating compartment door, or the inside of the refrigerating compartment, may be provided with an ice machine which generates ice.

The ice machine may include an ice making system which includes an ice tray for generating ice, an ice bucket in which the generated ice is stored, and a transfer system transferring the ice stored in the ice bucket to the dispenser.

In detail, the ice that is made in the ice making system may fall into the ice bucket positioned in the lower section of the ice tray and may accumulate there. Further, the ice which is stored in the ice bucket may be transferred to a front discharge port by the transfer system.

The transfer system may further include an auger motor system. The auger motor system may be configured to include an auger motor generating torque, an auger portion, under torque to transfer ice forward, a flange coupled with the auger portion to transfer the torque of the auger motor to the auger portion, an ice crusher rotating together with the auger portion to crush ice, a solenoid valve selecting whether to crush ice using the ice crusher, and a cold air duct connector provided with a drain hose and including an ice compartment fan by which air inside the ice compartment may flow.

However, contemporary auger motor systems are often manufactured by a method consisting of individually manufacturing casings, installing the parts, and then assembling the casings.

For example, the auger motor system may be completed by manufacturing a solenoid valve casing portion in which the solenoid valve is installed, an auger motor casing portion in which the auger motor is installed, and a cold motor connector casing portion in which the cold duct connector is installed, respectively, as separate injection molding products, and then installing the solenoid valve, the auger motor, and the cold air duct connector therein, and assembling the casings.

As such, the existing auger motor system has a very complex structure and a large number of parts requiring assembly, leading to high manufacturing costs and excessive assembling time.

SUMMARY OF THE INVENTION

In view of the above, embodiments of the present invention provide an all-in-one system of an auger motor for a refrigerator and a method for manufacturing the same.

In accordance with an embodiment of the present invention, an all-in-one system of an auger motor for a refrigerator is provided, including: a casing configured to integrally form a selector casing portion, an auger motor casing portion, and a cold air duct connector casing portion in one body; an ice selector configured to be installed in the selector casing portion; an auger motor device configured to be installed in the auger motor casing portion; and a cold air duct connector configured to be installed in the cold air duct connector casing portion.

The selector casing portion may be formed to protrude toward the front of the lower part of the casing, and the lower surface of the selector casing portion may be openly formed to have the ice selector inserted and the other surfaces thereof may be formed to be enclosed.

The auger motor casing portion may be formed to be depressed forward from a back of a lower part of the casing and the auger motor casing portion may be provided with a shaft hole into which a motor shaft of the auger motor device is inserted.

The auger motor device may be inserted into the auger motor casing portion from the back of the auger motor casing portion in a state in which an auger motor flange is disassembled, and thus the motor shaft may be inserted into the shaft hole and the auger motor flange may be installed to be assembled with the motor shaft protruding toward the front of the auger motor casing portion.

The auger motor casing portion may be provided with a locking portion which is locked to one part of the ice compartment when the casing is assembled with the ice compartment.

The cold air duct connector casing portion may be formed to be depressed forward from the back of the upper part of the casing and one part of the front of the cold air duct connector casing portion may be provided with a cold air discharge port.

A side wall of the casing may be provided with a vibration suppressing support groove which is coupled with one part of an inner wall of an ice compartment.

The cold air duct connector may be provided with an ice compartment fan.

In accordance with another embodiment of the present invention, a method for manufacturing an auger motor system is provided, including: injection-molding a casing to integrally form a selector casing portion, an auger motor casing portion, and a cold air duct connector casing portion in one body; installing an ice selector in the selector casing portion; installing an auger motor device in the auger motor casing portion; and assembling a cold air duct connector and installing the assembled air duct connector in the cold air duct connector casing portion.

The installing of the auger motor device may include first installing the auger motor device in the auger motor casing portion in a state in which an auger motor flange is disassembled to allow the motor shaft to protrude toward the front of the auger motor casing portion and then assembling the auger motor flange with the protruding motor shaft.

The installing of the cold air duct connector in the cold air duct connector casing portion may include additionally installing a sealing membrane to prevent cold air from leaking.

The installing of the auger motor device may include additionally installing a temperature sensor for measuring the temperature of the ice compartment in the auger motor casing portion.

An ice compartment fan and the cold air duct connector may be assembled together at the time of assembling the cold air duct connector.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Figure 1:
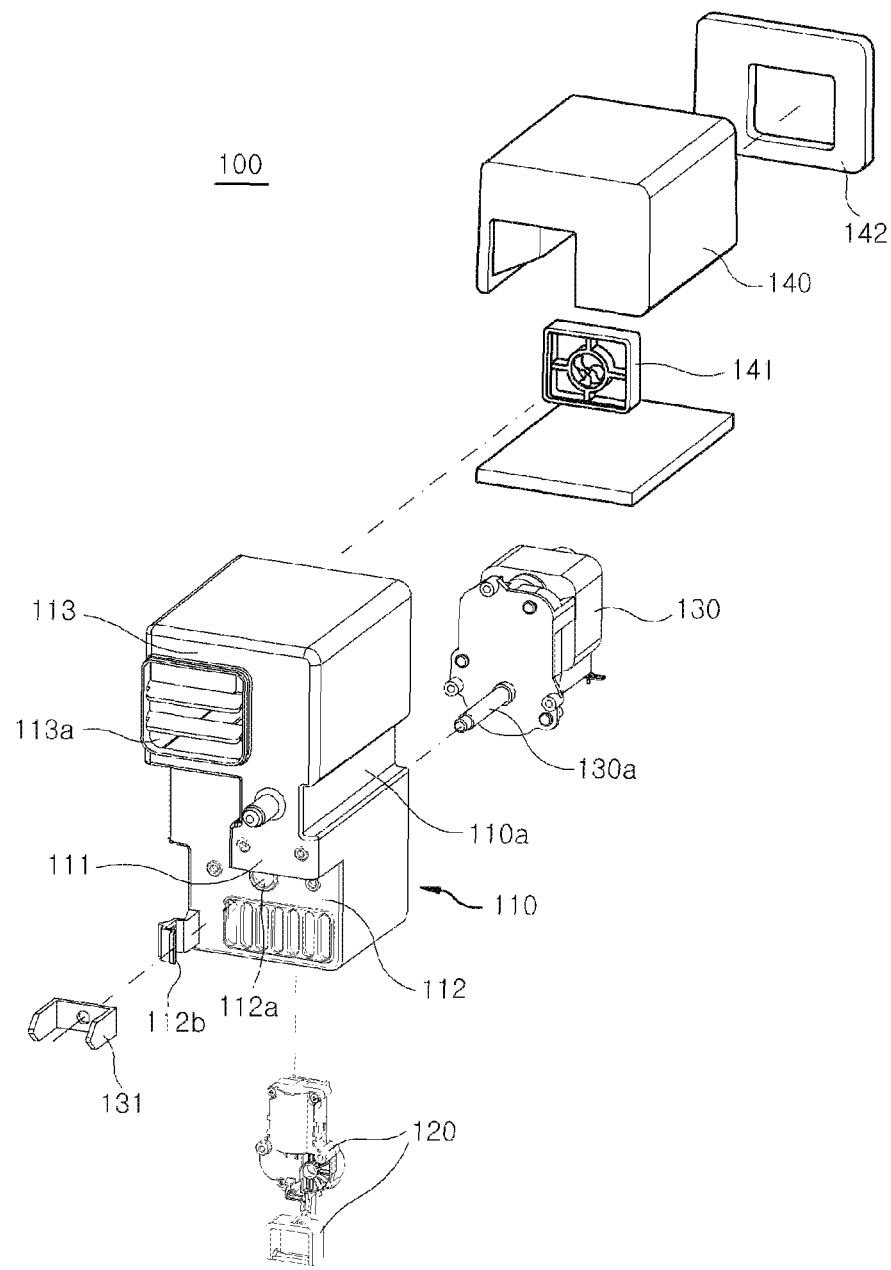
FIG. 1 is an exploded view of an exemplary all-in-one system of an auger motor for a refrigerator according to an embodiment of the present invention.

Hereinafter, constructions and actions according to embodiments of the present invention will be described in detail with reference to the accompanying drawings. The following description is one of aspects of the present invention which may be claimed as a patent and may form a portion of the detailed technologies of the present invention.

However, in describing the embodiments of the present invention, a detailed description of known constructions or functions will be omitted to make the present invention clear.

The present invention may be variously changed and include various embodiments, so that specific embodiments are illustrated in the drawings and will be described in detail below. However, it is to be understood that the present invention is not limited to the specific exemplary embodiments, but includes all modifications, equivalents, and substitutions included in the spirit and the scope of the present invention.

Terms including an ordinal number such as 'first', 'second', or others of the same kind can be used to describe various components, but the components are not to be construed as being limited to the terms. The terms are only used to distinguish one component from another component.

It is to be understood that when one element is referred to as being "connected to" or "coupled to" another element, it may be connected directly to or coupled directly to another element or be connected to or coupled to another element, having the other element intervening there between.

On the other hand, it is to be understood that when one element is referred to as being "connected directly to" or "coupled directly to" another element, it may be connected to or coupled to another element without the other element intervening there between.

Terms used in the present application are used only in order to describe specific embodiments rather than to limit the present invention. Singular forms are intended to include plural forms unless the context clearly indicates otherwise. It will be further understood that the terms "comprises" or "have" used in this application, specify the presence of stated features, numerals, steps, operations, components, parts, or a combination thereof, but do not preclude the presence or addition of one or more other features, numerals, steps, operations, components, parts, or a combination thereof.

Hereinafter, embodiments of the present invention will be described with reference to the accompanying drawings.

Figure 2:
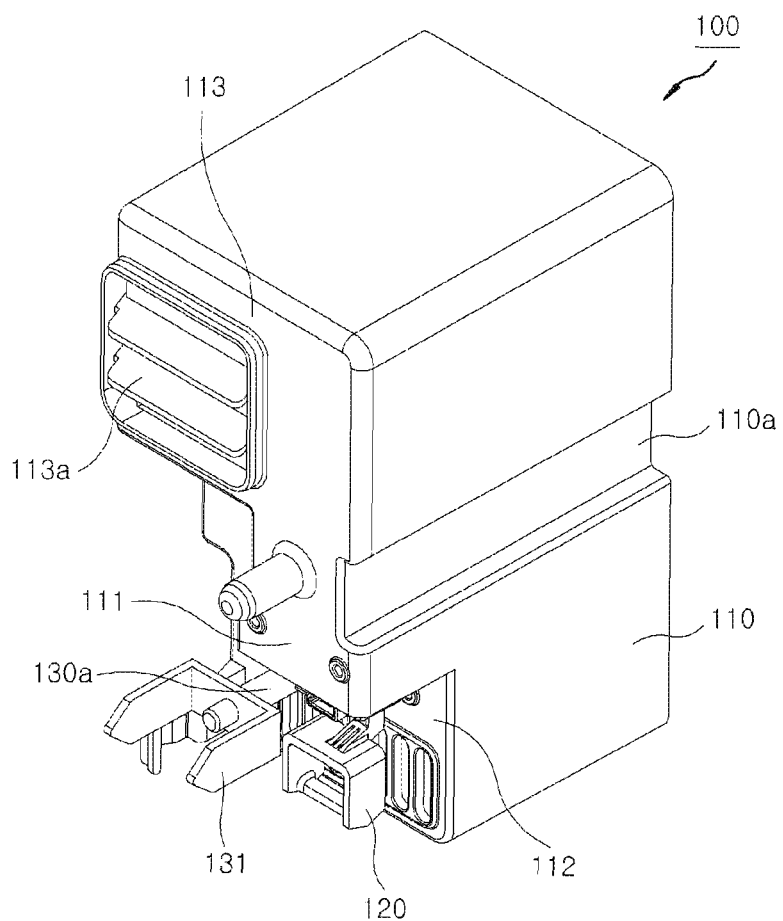
FIG. 2 is a coupled perspective view of FIG. 1.
Figure 3:
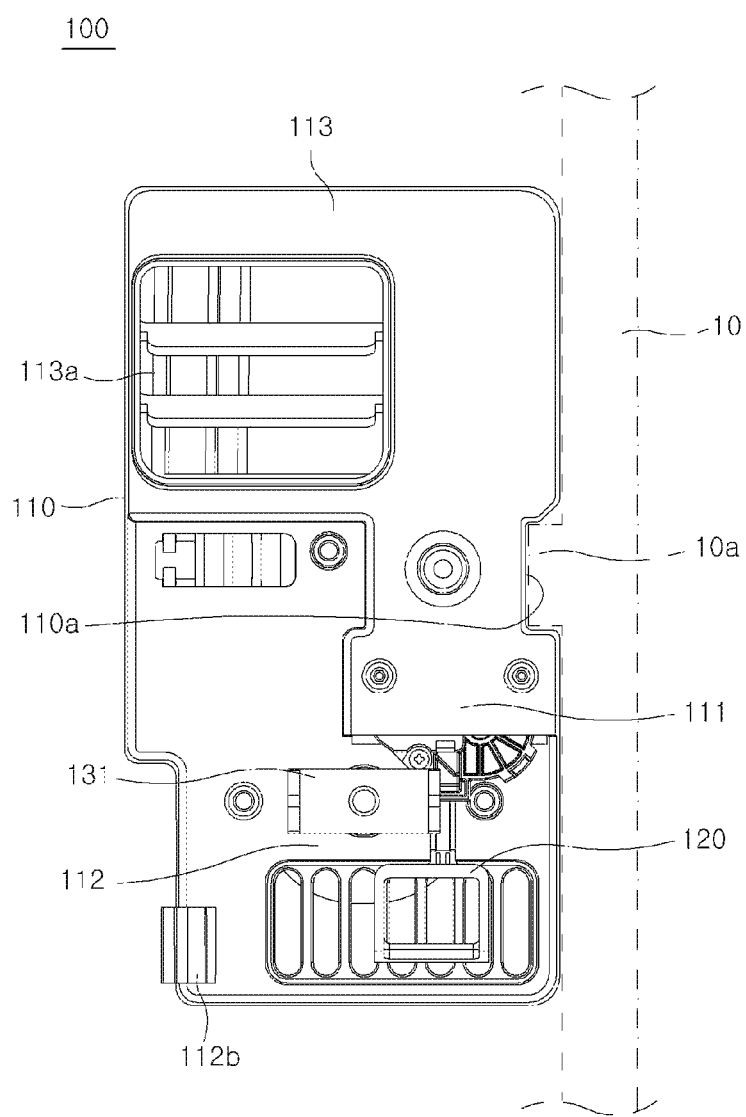
FIG. 3 is a front view of FIG. 2.

FIG. 1 is an exploded view of an exemplary all-in-one system of an auger motor for a refrigerator according to an embodiment of the present invention, FIG. 2 is a coupled perspective view of FIG. 1, and FIG. 3 is a front view of FIG. 2.

Referring to FIGS. 1 to 3, the system 100 of an auger motor for a refrigerator according to an embodiment of the present invention may include a casing 110, an ice selector 120, an auger motor device 130, and a cold air duct connector 140.

As illustrated in FIG. 1, the casing 110 may be configured to install the ice selector 120, the auger motor device 130, and the cold air duct connector 140 in one embodiment, in one single body. The casing 110 may be manufactured by injection molding to integrally form a selector casing portion 111, an auger motor casing portion 112, and a cold air duct connector casing portion 113.

The ice selector 120 may be installed in the selector casing portion 111. In this configuration, an AC or DC solenoid valve may be used as an ice selector 120.

Further, the auger motor device 130 may be installed in the auger motor casing portion 112.

The cold air duct connector 140 may be installed in the cold air duct connector casing portion 113. An ice compartment fan 141 by which air inside an ice compartment may flow may be disposed in or omitted from the cold air duct connector 140 as needed. The cold air duct connector 140 may be assembled in advance before being installed in the cold air duct connector casing portion 113.

The selector casing portion 111 and the auger motor casing portion 112 may be located in the lower section of the casing 110. The selector casing portion 111 may be formed to protrude forward at the lower part of the casing 110. In this case, the lower surface of the selector casing portion 111 is opened to have the ice selector 120 inserted and the other surfaces of the selector casing portion 111 may be enclosed by a panel configuring the casing 110. Therefore, the selector casing portion 111 may be covered so that the parts other than the lower surface thereof are not seen from the outside.

Further, the auger motor casing portion 112 may be formed to be depressed forward from the back of the low part of the casing 110 so that the auger motor device 130 may be installed from the back. A shaft hole 112a into which a motor shaft 130a of the auger motor device 130 is inserted may be formed in the auger motor casing portion 112.

When the auger motor device 130 is installed in the auger motor casing portion 112, the auger motor flange 131 is inserted into the auger motor casing portion 112 from the back portion of the auger motor casing portion 112 in a previously disassembled state and thus the motor shaft 130a may be inserted into the shaft hole 112a.

The disassembled auger motor flange 131 is then assembled with the motor shaft 130a protruding toward the front of the auger motor casing portion 112 and thus the installation of the auger motor device 130 may be completed.

When the casing 110 is assembled with an ice compartment 10, the auger motor casing portion 112 may be provided with a locking portion 112b which is locked to one part of the ice compartment. The locking portion 112b may be formed to protrude toward one part of the front of the auger motor casing portion 112 and may be made of an elastically deformable material to be elastically locked to one part of the ice compartment. Therefore, due to the locking part 112b, when the casing 110 is assembled with the ice compartment, the casing 110 may be fixed in the ice compartment 10 without being separated from the ice compartment 10 by an actuating force of the auger motor device 130.

Further, the cold air duct connector casing portion 113 may be formed in the upper section of the casing 110. The cold air duct connector casing portion 113 may be formed to be depressed forward from the back of the upper part of casing 110.

Further, the front of the cold air duct connector casing portion 113 may be provided with a cold air discharge port 113a so that the cold air may be discharged by the ice compartment fan 141 which is disposed in the cold air duct connector 140.

Meanwhile, a side wall of the casing 110 may be provided with a vibration suppressing support groove 110a which may be coupled with one part of the inner wall of the ice compartment. As illustrated in FIG. 3, the support groove 110a may be coupled with a support protrusion 10a which is formed at the inner wall of the ice compartment 10. Therefore, when the vibration occurring at the time of the operation of the auger motor device 130 causes the casing 110 to vibrate, the vibration may be transferred to the entire ice compartment by the coupling of the support groove 110a with the support protrusion 10a. The ice compartment has a weight relatively larger than that of the casing 110, and therefore the ice compartment is not greatly affected by the vibration and may absorb the vibration or disperse the vibration to other structures.

When the casing is coupled with the ice compartment through the support groove 110a and the support protrusion 10a, the stability and the support force of the casing 110 may be improved during the operation of the auger motor device 130.

Hereinafter, a method for manufacturing an auger motor system 100 according to another embodiment of the present invention will be described with reference to FIGS. 4 to 8.

Figure 4:
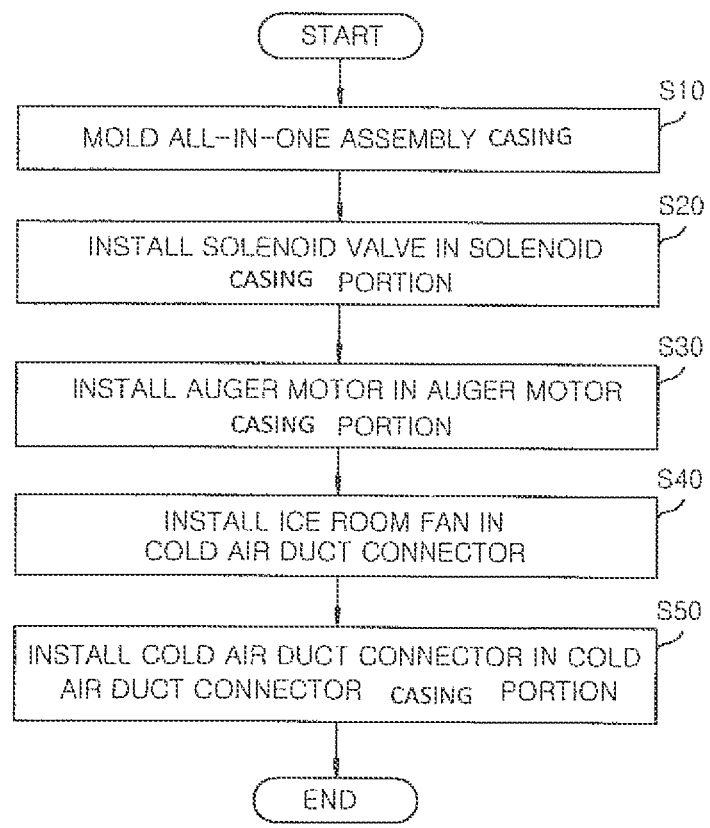
FIG. 4 is a flow chart illustrating an exemplary method for manufacturing an auger motor system according to an embodiment of the present invention.

FIG. 4 is a flow chart illustrating an exemplary method for manufacturing an auger motor system according to another embodiment of the present invention and FIGS. 5, 6, 7 and 8 are referenced views for describing a method for manufacturing an auger motor system according to another embodiment of the present invention.

As illustrated in FIG. 4, the method for manufacturing an auger motor system 100 according to the embodiment of the present invention may include molding an all-in-one casing (S10), installing the ice selector 120 in the selector casing portion 111 (S20), installing the auger motor device 130 in the auger motor casing portion 112 (S30), installing the ice compartment fan 141 in the cold air duct connector 140 (S40), and installing the cold air duct connector 140 in the cold air duct connector casing portion 113 (S50).

Figure 5:
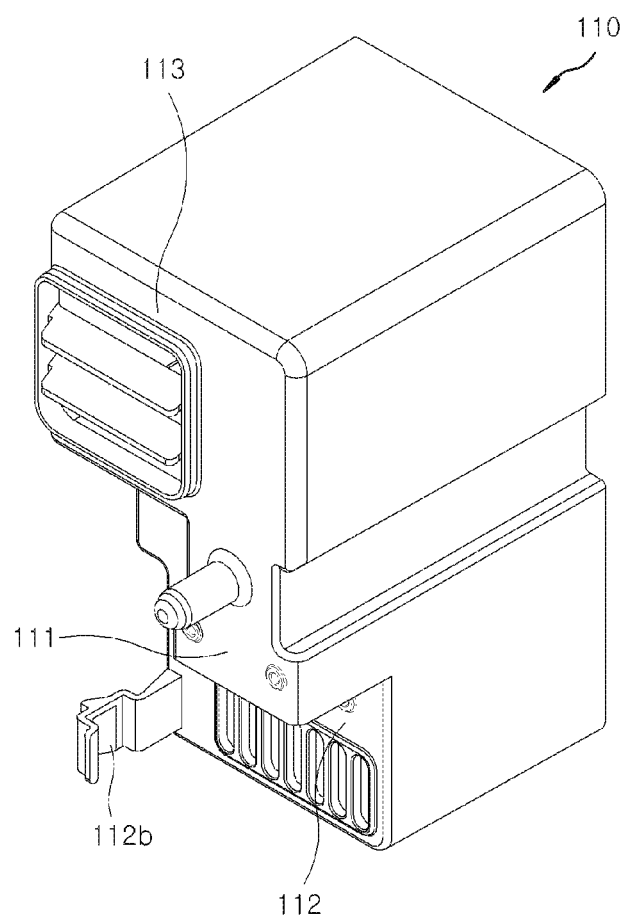
FIGS. 5 to 8 are referenced views for describing a method for manufacturing an auger motor system according to another embodiment of the present invention.

As illustrated in FIG. 5, first, in the molding of the all-in-one casing 110 (S10), the casing 110 may be injection-molded so that the selector casing portion 111, the auger motor casing portion 112, and the cold duct connector casing portion 113 are integrally formed in one body. The casing 110 may be made of a synthetic resin. In one embodiment, each position of the selector casing portion 111, the auger motor casing portion 112, and the cold air duct connector casing portion 113 is the same as described above.

Figure 6:
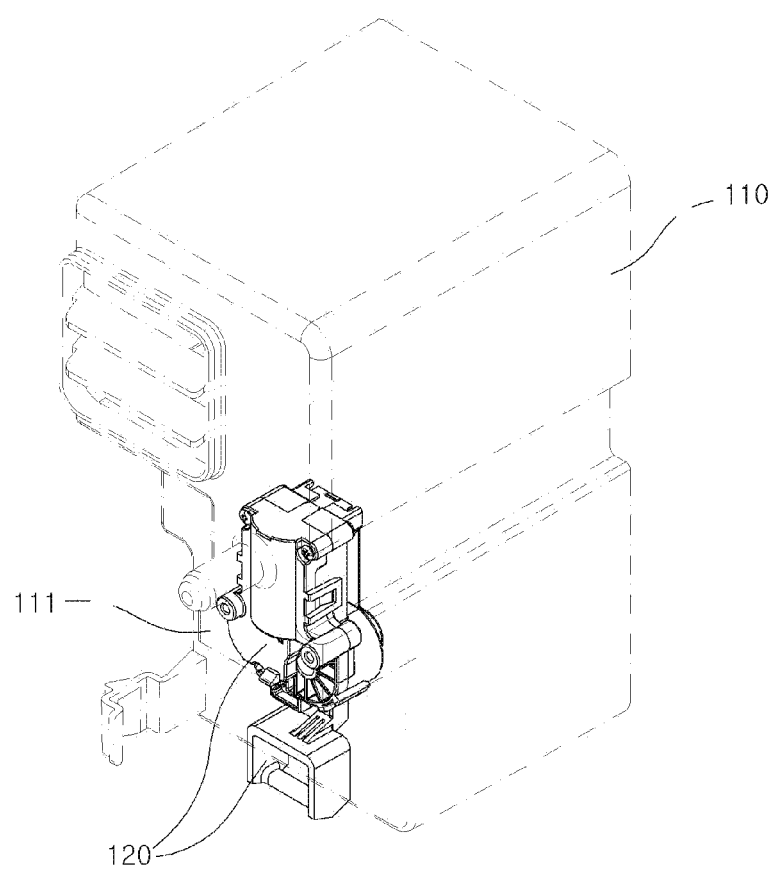

By doing so, after the all-in-one casing 110 is molded, as illustrated in FIG. 6, the ice selector 120 may be installed in the selector casing portion 111 of the casing 110.

As described above, the ice selector 120 is inserted upward from the lower part of the selector casing portion 111 and then may be installed by fastening members such as a bolt or screw.

Figure 7:
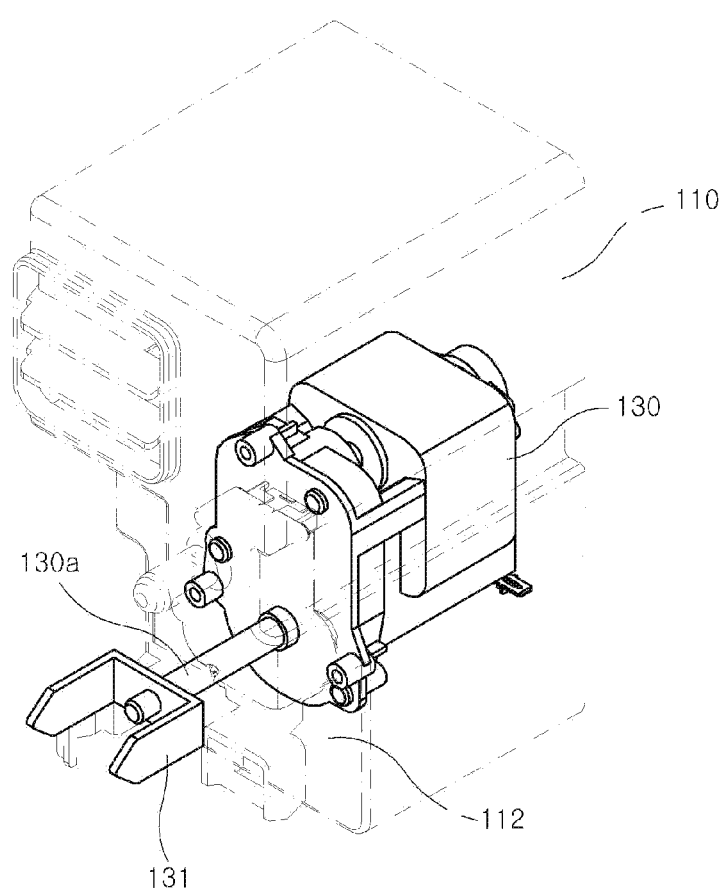

Further, as illustrated in FIG. 7, the auger motor device 130 may be installed in the auger motor casing portion 112 of the casing 110. As described above, when the auger motor device 130 is installed in the auger motor casing portion 112, the auger motor flange 131 is inserted into the auger motor casing portion 112 from the back portion of the auger motor casing portion 112 in the previously disassembled state and thus the motor shaft 130a may be inserted into the shaft hole 112a. The disassembled auger motor flange 131 is assembled with the motor shaft 130a in the state in which the motor shaft 130a protrudes toward the front of the auger motor casing portion 112.

The auger motor casing portion 112 may be provided with a temperature sensor for measuring the temperature of the ice compartment. Therefore, the method for manufacturing an auger motor system 100 may further include installing the temperature sensor in the auger motor casing portion 112.

Figure 8:
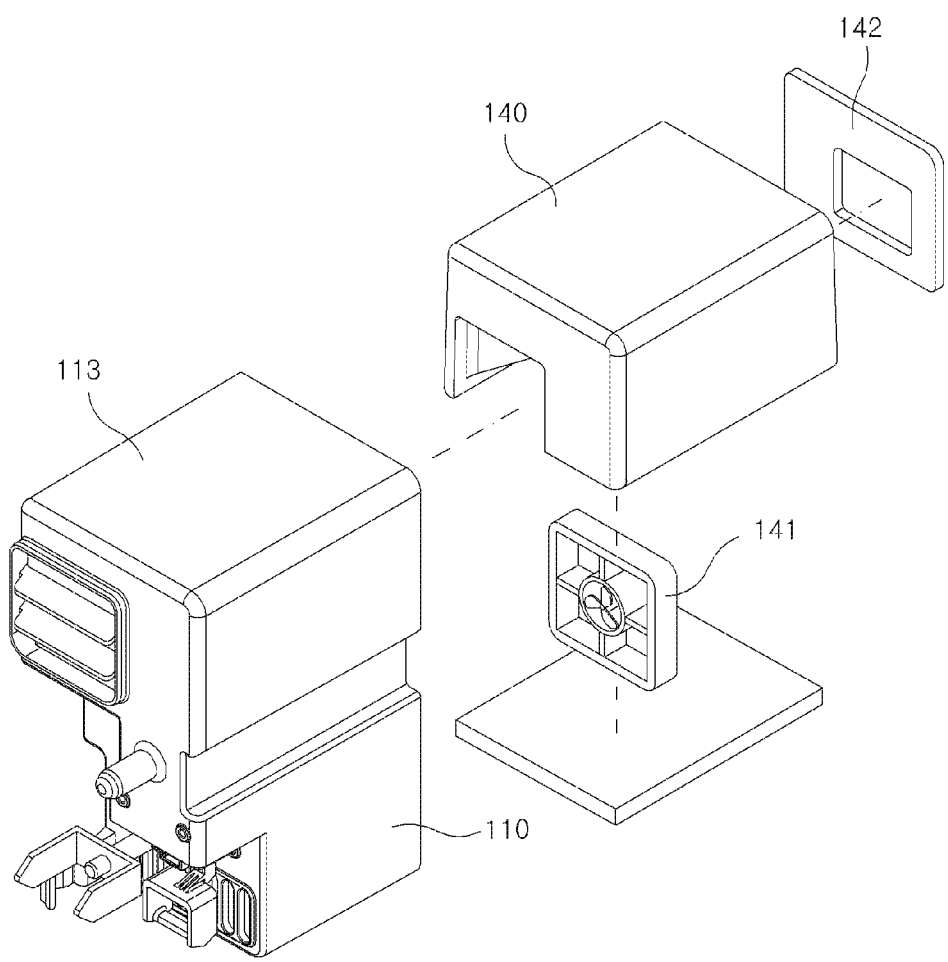

Further, as illustrated in FIG. 8, the cold air duct connector 140 may be installed in the cold air duct connector casing portion of the casing 110. Here, assembling the cold air duct connector 140 may be performed prior to installing the cold air duct connector 140 in the cold air duct connector casing portion 113.

The cold air duct connector 140 may be manufactured in a mold and the cold duct connector 140 may be provided with the ice compartment fan 141. Therefore, the ice compartment fan 141 may be installed in the cold air duct connector 140 in advance. Further, to prevent cold air from leaking from the cold air duct connector 140, the method for manufacturing an auger motor system 100 may further include installing a sealing membrane 140 in the cold air duct connector 140.

As such, when the assembling of the cold air duct connector 140 is completed, the assembled cold air duct connector 140 is installed in the cold air duct connector casing portion 113 and thus the assembling of the auger motor system 100 may be completed.

While the present invention has been described with respect to the preferred embodiments, the scope of the present invention is not limited to the specific embodiments. It will be understood that a person having ordinary skill in the art to which the present invention pertains may substitute and change components without any limitation and these substitutions and changes also belong to the scope of the present invention.

What is claimed is:

1. A system of an auger motor device for a refrigerator, comprising:
   a casing comprising a single body configured to integrally form a selector casing portion, an auger motor casing portion, and a cold air duct connector casing portion by injection molding;
   an ice selector configured to be installed in the selector casing portion;
   an auger motor device configured to be installed in the auger motor casing portion; and
   a cold air duct connector configured to be installed in the cold air duct connector casing portion,
   wherein a side wall of the casing is provided with a vibration suppressing support groove which is coupled with one part of an inner wall of the ice compartment,
   wherein the vibration suppressing support groove is formed to extend in an axial direction of a motor shaft of the auger motor device,
   wherein an ice compartment fan by which air inside an ice compartment flows is disposed in the cold air duct connector,
   wherein one part of a front of the cold air duct connector casing portion is provided with a cold air discharge port, and
   wherein the cold air discharge port and the fan face each other in the axial direction of the motor shaft of the auger motor device.

2. The system of claim 1, wherein the selector casing portion is formed to protrude toward a front of a lower part of the casing and a lower surface of the selector casing portion is openly formed to have the ice selector inserted and wherein the other surfaces thereof are formed to be enclosed.

3. The system of claim 1, wherein the auger motor casing portion is formed to be depressed forward from a back of a lower part of the casing and wherein the auger motor casing portion is provided with a shaft hole into which the motor shaft of the auger motor device is inserted.

4. The system of claim 3, wherein the auger motor device is inserted into the auger motor casing portion from a back of the auger motor casing portion in a state in which an auger motor flange is disassembled and thus the motor shaft is inserted into the shaft hole and the auger motor flange is installed to be assembled with the motor shaft protruding toward the front of the auger motor casing portion.

5. The system of claim 1, wherein the cold air duct connector casing portion is formed to be depressed forward from a back of an upper part of the casing.

6. The system of claim 1, further comprising a temperature sensor accommodated in the auger motor casing portion for measuring the temperature of an ice compartment.

7. The system of claim 1, further comprising a sealing membrane in the cold air duct connector to substantially prevent cold air from leaking.

8. A refrigerator comprising:
   a main body;
   doors disposed on the main body so as to be rotatable; and
   a system of an auger motor device, the system comprising:
     a casing comprising a single body configured to integrally form a selector casing portion; an auger motor casing portion, and a cold air duct connector casing portion by injection molding;
     an ice selector configured to be installed in the selector casing portion;
     an auger motor device configured to be installed in the auger motor casing portion; and
     a cold air duct connector configured to be installed in the cold air duct connector casing portion,
   wherein the auger motor casing portion is provided with a locking portion which is locked to one part of an ice compartment of the refrigerator when the casing is assembled with the ice compartment,
   wherein a side wall of the casing is provided with a vibration suppressing support groove which is coupled with one part of an inner wall of the ice compartment, and
   wherein the vibration suppressing support groove is formed to extend in the axial direction of a motor shaft of the auger motor device,
   wherein an ice compartment fan by which air inside an ice compartment flows is disposed in the cold air duct connector,
   wherein one part of a front of the cold air duct connector casing portion is provided with a cold air discharge port, and
   wherein the cold air discharge port and the fan face each other in the axial direction of a motor shaft of the auger motor device.

9. The refrigerator of claim 8 wherein the selector casing portion is formed to protrude toward a front of a lower part of the casing and a lower surface of the selector casing portion is openly formed to have the ice selector inserted and wherein the other surfaces thereof are formed to be enclosed.

10. The refrigerator of claim 8 wherein the auger motor casing portion is formed to be depressed forward from a back of a lower part of the casing and wherein the auger motor casing portion is provided with a shaft hole into which the motor shaft of the auger motor device is inserted.

11. The refrigerator of claim 8 wherein the auger motor device is inserted into the auger motor casing portion from a back of the auger motor casing portion in a state in which an auger motor flange is disassembled and thus the motor shaft is inserted into the shaft hole and the auger motor flange is installed to be assembled with the motor shaft protruding toward the front of the auger motor casing portion.

12. The refrigerator of claim 8 wherein cold air duct connector casing portion is formed to be depressed forward from a back of the upper part of the casing.

* * * * *